United States Patent
O'Donnell et al.

(10) Patent No.: US 7,707,609 B2
(45) Date of Patent: Apr. 27, 2010

(54) SYSTEM AND METHOD FOR DYNAMICALLY SCHEDULING QUASI ON-DEMAND PROGRAMMING IN A BROADCAST TELEVISION NETWORK

(75) Inventors: Laura J. O'Donnell, El Segundo, CA (US); Stephen P. Dulac, Santa Clarita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1074 days.

(21) Appl. No.: 10/827,944

(22) Filed: Apr. 20, 2004

(65) Prior Publication Data
US 2005/0235330 A1    Oct. 20, 2005

(51) Int. Cl.
*H04N 5/445* (2006.01)
(52) U.S. Cl. .............................. 725/61; 725/39; 725/46; 725/50; 725/86; 725/87
(58) Field of Classification Search ................... 725/39, 725/46, 86, 87
See application file for complete search history.

(56) References Cited

U.S. PATENT DOCUMENTS

| | | | | |
|---|---|---|---|---|
| 5,351,075 | A * | 9/1994 | Herz et al. | 725/13 |
| 5,521,631 | A * | 5/1996 | Budow et al. | 725/78 |
| 6,898,762 | B2 * | 5/2005 | Ellis et al. | 715/716 |
| 7,124,424 | B2 * | 10/2006 | Gordon et al. | 725/43 |
| 2002/0078440 | A1 * | 6/2002 | Feinberg et al. | 725/9 |
| 2003/0023975 | A1 * | 1/2003 | Schrader et al. | 725/51 |
| 2003/0028882 | A1 * | 2/2003 | Davis et al. | 725/44 |

\* cited by examiner

*Primary Examiner*—Brian T Pendleton
*Assistant Examiner*—Nnenna N Ekpo

(57) ABSTRACT

Quasi on-demand programming is dynamically scheduled in a broadcast television network to improve customer service, enhance programming flexibility and increase the value proposition of the service provider. A Program Offer including a "delivery window" for each program and an initial Playlist for broadcasting regular, PPV and offered programming are created. Customer demand for individual programs in the offering is surveyed. This information is used to reoptimize the Playlist prior to broadcast and to update a "rolling" Program Offer to better manage network capacity and improve custom satisfaction.

28 Claims, 5 Drawing Sheets

|  | Program Offer ||
| --- | --- | --- |
|  | Programs | Delivery Window |
|  | A | 1 Day |
|  | B | 3 Days |
|  | C | 1 Week |

Fig. 3

|  | 1 | 2 | 3 | 4 | 5 | 6 |
| --- | --- | --- | --- | --- | --- | --- |
| CH1 | 68 →  |  |  | → |  |  |
| CH2 |  |  |  |  |  |  |
| CH3 |  |  | 70 → |  |  | → |
| CH4 |  |  |  |  |  |  |
| CH5 | 72 → |  |  | → |  |  |
| CH6 |  |  |  |  |  |  |

Fig. 4

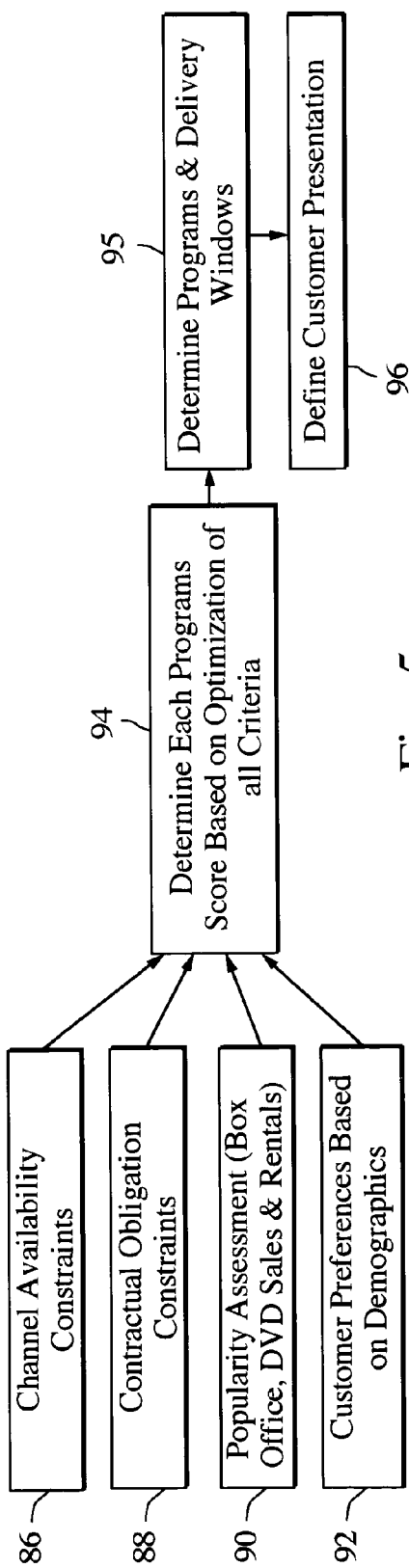
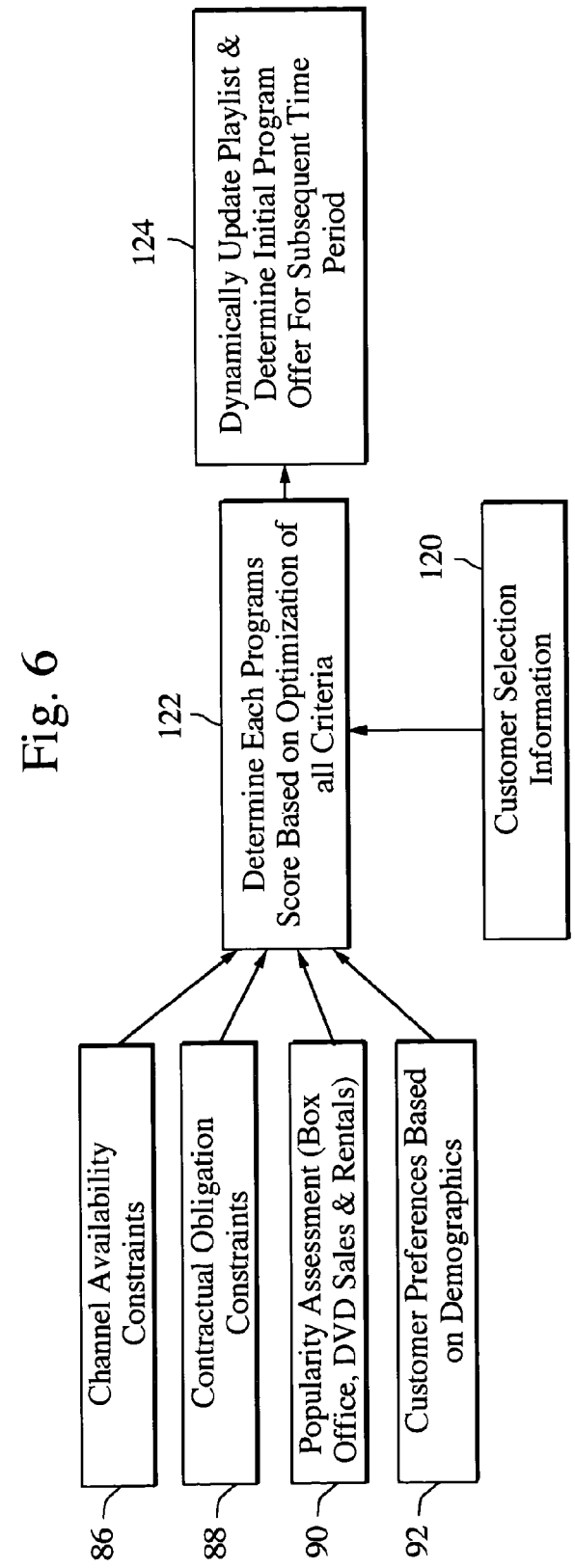
Fig. 5
Fig. 6

SYSTEM AND METHOD FOR DYNAMICALLY SCHEDULING QUASI ON-DEMAND PROGRAMMING IN A BROADCAST TELEVISION NETWORK

BACKGROUND OF THE INVENTION

1. Field of the Invention

This invention relates to broadcast television and more specifically to the dynamic scheduling and broadcast of quasi on-demand programming.

2. Description of the Related Art

Television programming is broadcast over analog broadcast channels, cable services and satellite networks. Satellite service providers such as DIRECTV® and EchoStar Communications Corp. (Dish Network™) provide a wide variety of customer-based programming including regularly scheduled programming and pay-per-view (PPV). Satellite service providers would like to provide their customers with "On-Demand" programming in which a customer could view a Program Offer, select a program and have it downloaded to his or her television in virtually real-time. Unfortunately this is not presently viable due to channel constraints and economic considerations. Instead service providers are offering quasi On-Demand programming in which programs are broadcast to customers at unpublished times and downloaded to their digital video recorder (DVR) for playback at a later time. How the programs are selected and when they are broadcast depends on the service.

DIRECTV® and STARZ® jointly offer a "STARZ Subscription On-Demand" service freely to customers who are customers to both DIRECTV's DVR service and the STARZ service. STARZ selects a number of movies from its broadcast schedule that are automatically delivered by the DIRECTV network to qualifying customers. The movies are delivered overnight on random days during, for example, a two week period. The customer has no input in selecting what movies are sent or when they are sent. Furthermore until the customer checks his or her "inbox" the customer has no idea what movies will be sent or when. The service is provided to encourage customers to use the STARZ subscription services.

U.S. Pat. No. 5,790,935 describes a system for delivering virtual on-demand information over a digital transport system such as a satellite network by offloading a portion of the system's peak bandwidth requirements to the local customers. A collaborative filtering system synthesizes the preferences of all the customers and then predicts those items that each customer might like, and therefore request. Each customer is provided with a local storage device for storing, during off-peak hours, those items recommended by the collaborative filtering system. As a result, only a relatively few customer requests must be serviced directly from the central distribution system.

SUMMARY OF THE INVENTION

The present invention provides for dynamically scheduling quasi on-demand programming in a broadcast television network to improve customer service, enhance programming flexibility and increase the value proposition of the satellite provider.

This is accomplished by creating a Program Offer in which each of the programs in the offer has a "delivery window" guaranteed by the network provider. The "delivery window" is determined by one or more constraints such as carriage agreements, channel availability, popularity assessment (box office, DVD sales and rentals), and customer demographics. A Playlist for broadcasting all programming including regular programs, PPV and the Program Offer is also created. The Playlist and Program Offer must satisfy the constraints imposed by each other. Unlike regular and PPV programming, the Program Offer and Playlist do not have to be the same and the Playlist can be updated even after the Program Offer is sent to the customers. Customers make their selections from the Program Offer with knowledge of what programs are available and the guaranteed delivery window.

In an exemplary embodiment, customer requests and possibly actual usage are surveyed, aggregated and reported back. This offer specific demand information can be used to dynamically update the Playlist and create a "rolling" Program Offer. More specifically, the Playlist is reoptimized based on current constraints of carriage agreements, channel availability, popularity assessment (box office, DVD sales and rentals), and customer demographics and the actual demand from the customer base. For example, a program in high demand may be broadcast sooner, more often and over a higher quality channel. The same information is used to update the Program Offer. For example, the delivery windows for very popular programs may be shortened. Conversely, the delivery window for less popular programs may be lengthened or the program removed from the offer altogether unless dictated by a carriage contract.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 3 is a diagram of a portion of a typical Program Offer;

FIG. 4 is a diagram of a portion of a typical Playlist;

FIG. 5 is a flowchart for determining the initial Program Offer;

FIG. 6 is a flowchart for dynamically updating the Playlist and Program Offer.

DETAILED DESCRIPTION OF THE INVENTION

The present invention provides for dynamically scheduling quasi on-demand programming in a broadcast television network to improve customer service, enhance programming flexibility and increase the value proposition of the service provider. A Program Offer including a "delivery window" for each program and an initial Playlist for broadcasting regular, PPV and offered programming are created. Customer demand for individual programs in the offering is surveyed. This information is used to reoptimize the Playlist prior to broadcast and to update a "rolling" Program Offer to better manage network capacity and improve custom satisfaction.

The demographics and interests of the general public may not accurately reflect the demographics and interests of actual customers. Therefore, programming that does well at the box office may not prove interesting to customers and vice versa. By measuring the general viewing habits of customers, the service provider can better assess the interest in a specific program or more broadly a specific type of programming. Even more compelling, by measuring the viewing habits of high-value customers, the service provider may offer programming uniquely interesting to those customers and thus increase opportunity for revenue or improve customer satisfaction.

Figure 1:
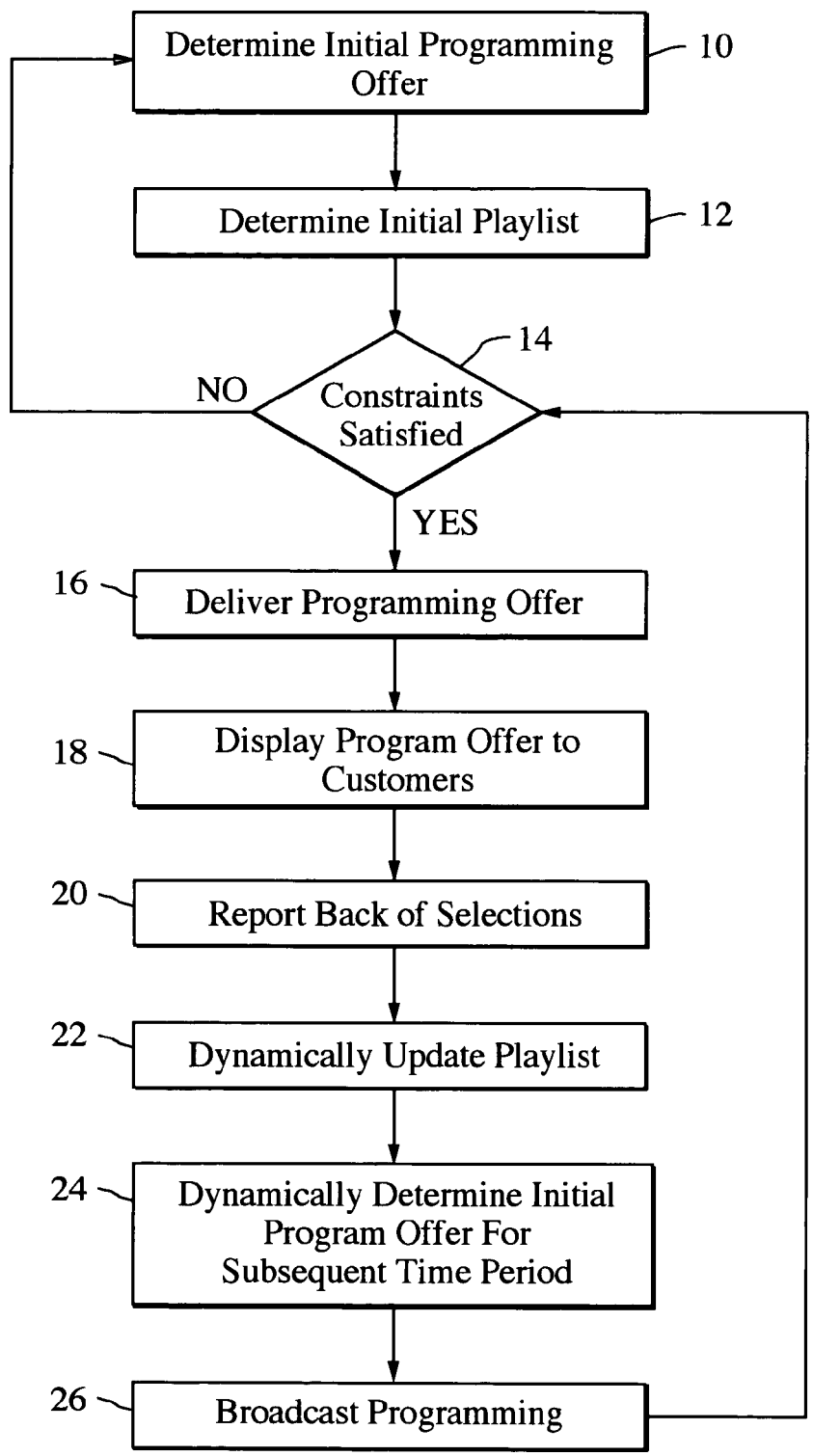
FIG. 1 is a flowchart for dynamically scheduling programming in accordance with the invention.

As illustrated in FIG. 1, the first step is to determine an initial Program Offer (step 10). The Program Offer will include a number of programs and their respective delivery windows (overnight, 3-days, 1 week). The selection of programs and their delivery windows are based on a number of constraints including contracts, available bandwidth, popularity and customer demographics. Unlike program guides for regular and PPV programming that must be published at least two weeks ahead of broadcast, the Program Offer can be published one week prior to delivery and possibly less. Next, an initial Playlist for broadcasting programming is determined (step 12). The Playlist must accommodate the fixed time slots occupied by the regular and PPV programming and the delivery windows specified by the Program Offer. If the initial Playlist can not satisfy all of these constraints (step 14), some of the delivery windows are relaxed (lengthened). The process is repeated until all constraints are met and a final Program Offer is determined. The final Program Offer is delivered to the customers (step 16) who can view the offer on their TV or video monitor (step 18) and make selections at their leisure. The customer does not know precisely when any program will be broadcast but does know the guaranteed delivery window.

In an exemplary embodiment, the customers' program selections are reported back (step 20) and aggregated to provide a measure of customer demand for the different programs in the offer. The customer demand is then combined with the previous factors (popularity, demographics, contracts, bandwidth) to dynamically update the Playlist (step 22). For example, highly popular programs may be broadcast sooner, more often or on a more reliable channel. The same information can also be used to determine the initial Program Offer (step 24) for a subsequent time period. The delivery windows for highly popular programs may be shortened. Conversely, unpopular programs may have their delivery windows lengthened or may be eliminated altogether. The updated Playlist is then used to broadcast the programming (step 26).

These dynamic scheduling techniques will now be described with reference to a DIRECTV® system of the type shown and described in FIGS. 2 through 7. However, it is understood that the techniques may be used in any broadcast television network having a high data rate broadcast network to deliver programming content from the headend to customers and at least a low data rate backchannel to communicate program requests and other information from the individual customers back to the headend.

Figure 2:
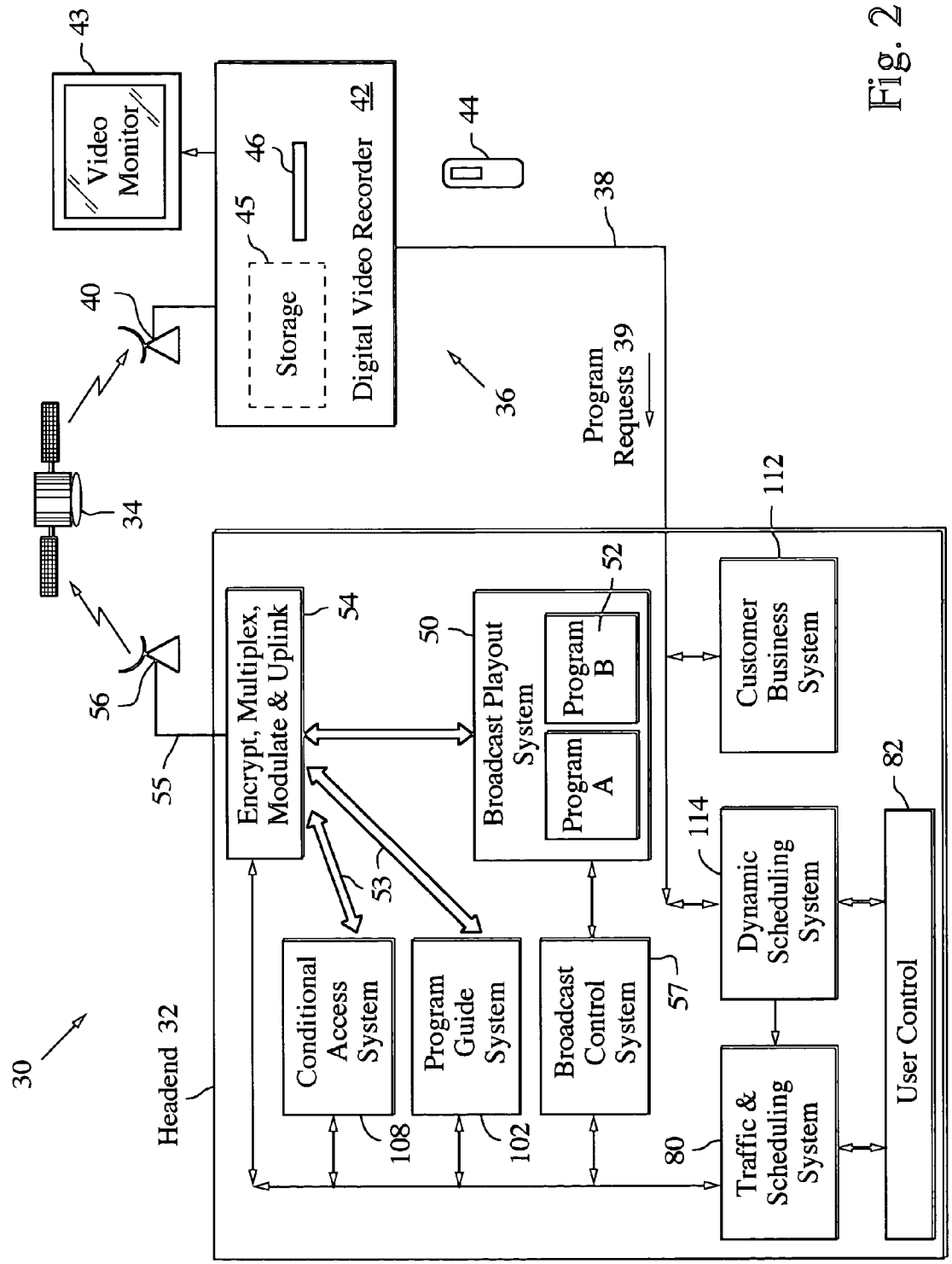
FIG. 2 is a block diagram of the DIRECTV® system including a dynamic scheduling system.

As shown in FIG. 2 a DIRECTV® system 30 includes at least one headend 32 that stores, offers and uplinks regular, PPV and offered programming content, to one or more satellites 34 that broadcast the uplinked programming, customer sites 36 that receive, sometimes store and play selected programming, and a back channel 38 for reporting program requests 39 and other information back to headend 32 for purposes of billing and dynamic scheduling. Each customer site 36 includes an antenna 40, an integrated receiver decoder (IRD) that can be provided as a set-top box or, as shown here, integrated as part of a digital video recorder (DVR) 42 that provides many other features and services such as TiVo®, a video monitor 43, and typically a remote control 44. The DVR includes storage 45 for storing programs and is paired with a customer specific access card 46 that provides account information and encryption keys. The access card functionality may be integrated with the IRD or on a replaceable media such as a smart card.

Headend 32 includes a broadcast playout system 50 that stores and/or routes programs 52 (video, audio, data) to an uplink system 54 that encrypts, multiplexes, and modulates selected programs and metadata 53 into a broadcast stream 55 and uplinks it through antenna 56 to satellite 34. Programming may be delivered to the playout system ahead of time such on pre-recorded media or recorded off a contribution link (satellite, fiber, etc.) or delivered real-time via the contribution link. A broadcast control system 57 is responsible for executing the Playlist thereby causing the playout system 50 to direct selected programs 52 at specified time slots to the uplink system 54 for broadcast.

Figures 3, 4:
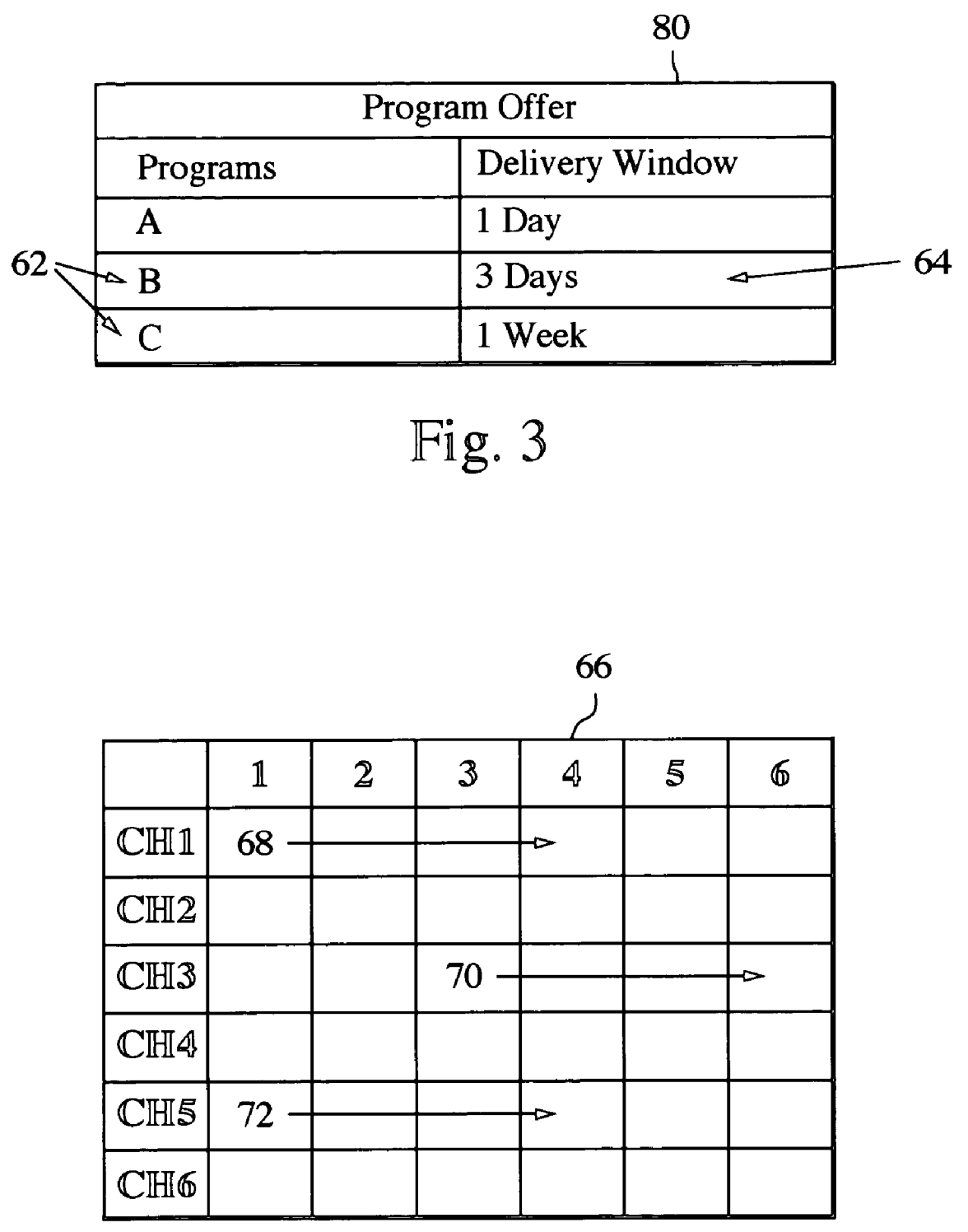

Regularly scheduled and PPV programming is offered to customers via a Program Guide that specifies the program, time and channel and may provide a brief description and other information such as price. Quasi on-demand programming is offered to customers via a Program Offer 60, an example of which is as shown in FIG. 3, that specifies the program 62 and a delivery window 64 (overnight, 3 days, 1 week) instead of specific time. The offer may also include a price, brief description, movie clips etc. The programs are broadcast according to a Playlist 66 as shown in FIG. 4 in which the time slots 68 and 70 for regular and PPV programming are dictated by the times published in the Program Guide and the time slots 72 for quasi on-demand programming must satisfy the guaranteed delivery windows.

A traffic and scheduling system 80 with input from users via a user interface 82 determines the initial Program Offer 60. As shown in FIG. 5, users input such constraints as channel availability 86, carriage agreements 88, popularity assessment 90 (box office, DVD sales and rentals), and customer preferences 92 that are based on demographics into the system. The traffic and scheduling system determines a score for each program based on a weighted sum of all criteria 94 and assigns a desired delivery window based on the relative scores 95. The user will also typically define the customer presentation 96, e.g. graphics, text, program snippets, that will be associated with the Program Offer.

Consider a simple example in which a program can be assigned into one of three categories: Daily broadcast, 3 weekly broadcasts, 1 weekly broadcast. A program is given a score based on the average of scores received for the following criteria: box office 90 and customer preferences 92. If the score is greater than 80 the program is broadcast daily. If the score is between 41 and 79, the program is broadcast 3 times per week and if 40 or below only once per week. Program A scores a 90 for Box Office and 70 for Correlation with Customer Preferences. With an average score of 80, that program should be broadcast daily unless channel constraints 86 prevent it. Program B scores a 30 for Box Office and 50 for Correlation with Customer Preferences. With an average score of 40, that program should be scheduled only once per week unless, for example, the service operator has a contractual obligation 88 to offer the program more often.

Once a desired Program Offer is generated, the traffic and scheduling system 80 with input from users will determine the initial Playlist 66 that attempts to satisfy the regular, PPV and quasi on-demand offerings. If all the constraints are not satisfied the delivery windows of the programming offer are lengthened or programs are eliminated altogether, and the process repeated until an initial Playlist can be found that satisfies the constraints.

Once an initial Playlist 66 is determined, the Program Guide and Program Offer are directed to a program guide system 102 that converts them into metadata 53 that is readable by the customer's IRD/DVR, which presents the Program Offer (and Program Guide) to the customer for viewing and selection. A conditional access system 108 provides access metadata 53 such as entitlement management messages (EMMs) that are delivered to customers and entitlement control messages (ECMs) that are associated with services. In the context of the Program Offer, an EMM would indicate whether a particular customer's services includes quasi on-demand programming and the ECM would tag outgoing programming as being part of the Program Offer. This access metadata is used by the access card 46 to allow the customer to make selections using remote control 44. These selections may then be downloaded to storage 45 sometime within the delivery window for the subscriber to view on video monitor 43 at his or her convenience.

Each customer's program selections and perhaps actual viewing habits are reported back by a modem in the DVR via the back channel 38 to a customer business system 112 (typically distributed through a number of locations and functions) for billing and other customer services. The program selections from the Program Offer are also aggregated for all customers and directed to a dynamic scheduling system 114 that updates the Playlist 66 and the Program Offer 60 based on actual demand from DIRECTV customers for programs in the current Program Offer. The dynamic scheduling system is shown as a distinct system for purposes of illustration but may be integrated with the traffic and scheduling system.

As shown in FIG. 6, the Playlist and Program Offer are updated by inputting the current conditions for carriage agreements 88, channel availability 86, popularity assessment 90 (box office, DVD sales and rentals), and customer preferences 92 and customer request and usage data 120, determining an updated score for each program based on a weighted sum of all criteria 122 and adjusting the time slots in the Playlist for the current Program Offer and the delivery windows in the Program Offer accordingly 124. The updated Playlist is passed to broadcast control system 57 that in turn causes the programming to be broadcast at the appropriate time slots.

Considering the earlier example, it turns out that the customer requests for Program A are not very high, having a score of only 50 and that customer requests for Program B are higher than expected having a score of 70. Assuming the box office and demographic data do not change, newly calculated average scores for Program A and B are (90+70+50)/3=70 and (30+50+70)/3=50, respectively. As a result, the broadcast schedules for each are revised so each is broadcast 3 times per week. The delivery windows in the Program Offer for each are revised in the next time period to reflect this change.

In general the criteria used for dynamically scheduling programs will normally be of sufficient complexity that the Dynamic Scheduling System necessarily is implemented as an automated system. A Dynamic Scheduling System can consider all of these areas at once when creating the broadcast schedule. Areas of complexity include:

The time value of the reportback information: as the information ages its relevance diminishes insofar as predicting future customer behavior.

Scheduling suited to time zones of customers whose preferences aren't uniform across a service area.

Addition of pre-recording of programs to the DVR prior to being purchased by the customer to the available scheduling options.

Contractual constraints are often highly complex, for example, based on combinations of minimum sales thresholds and minimum number of broadcasts.

Figure 7:
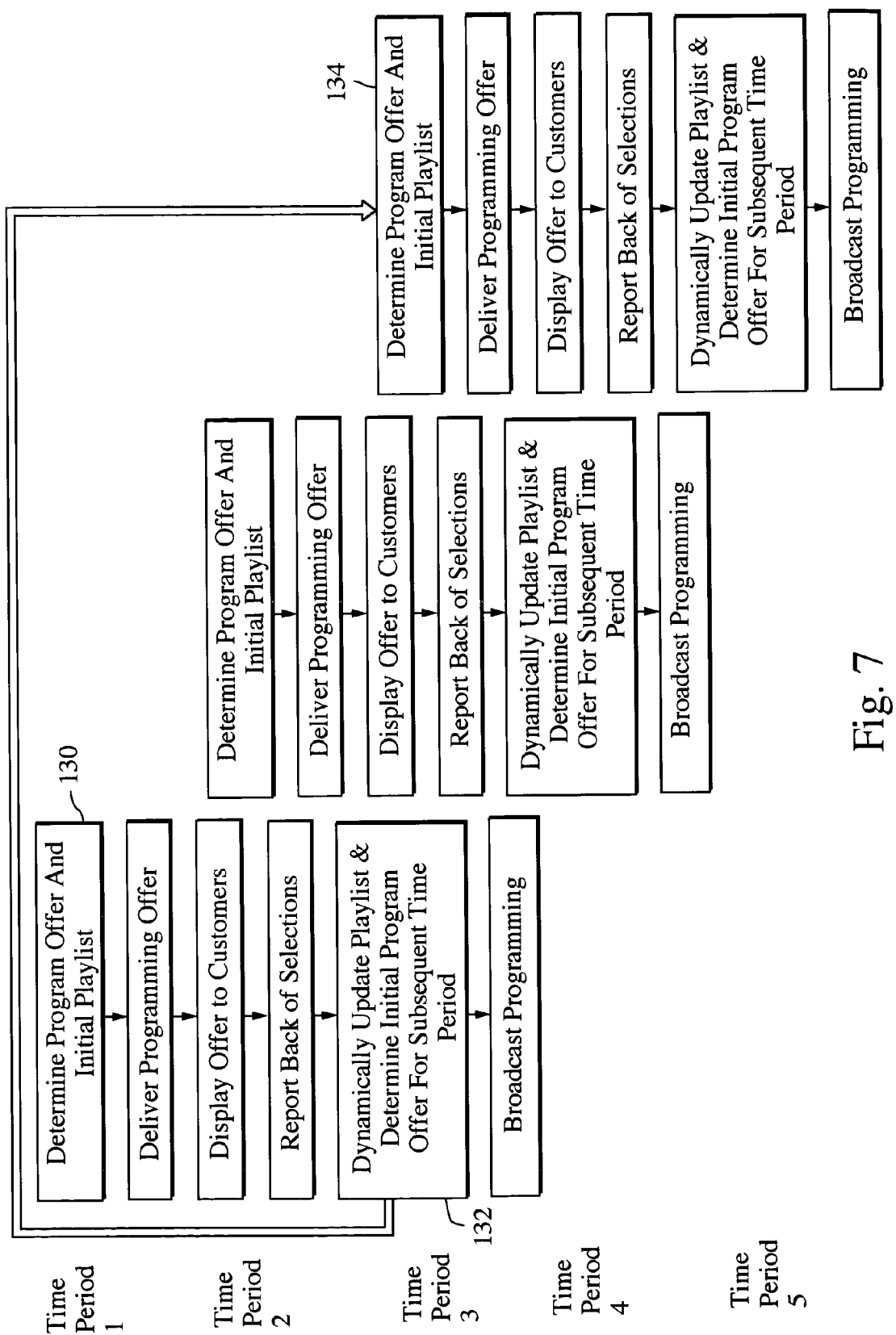
FIG. 7 is a diagram illustrating a "rolling" update of the Program Offer.

The concept of a "rolling" Program Offer is illustrated in FIG. 7. Assuming a first Program Offer 130 is delivered in time period 1, an updated Program Offer 132 is generated in time period 3 and can be rolled into the initial Program Offer 134 generated in time period 3. As a result the initial Program Offer, hence initial Playlist are being periodically updated as constraints and customer demand changes. In this particular example, the Program Offers are "interleaved" to skip at least one time period. The Program Offer generated in time period 1 and updated in time period 3 is actually broadcast in time period 4 within the delivery windows of original Program Offer. The updated Program Offer becomes the initial Program Offer, which may be iterated with the Playlist before delivery to the customer, in time period 3. This Program Offer is in turn updated in time period 5 and rolled forward. The programming for the current Program Offer is broadcast in time period 6 within the delivery windows of that Program Offer.

To further illustrate the use of a "delivery window" and dynamic scheduling consider the following examples. If by 10 PM, Program A is selected by 5% of the requesting customers and Program A is advertised with a commitment of delivery by 6 AM the next day, this program may be broadcast 3 times to increase likelihood of delivery by 6AM. Alternatively, if on Tuesday 1% of requesting customers selected Program B and Program B is advertised with a commitment of delivery within 7 days, Program B may be scheduled for broadcast on Monday to allow for requests for the rest of the week to be fulfilled by a single broadcast. Additionally, the commitment for Program B may be altered to other customers to reflect the broadcast schedule, i.e., in this same scenario Program B is planned for broadcast on Monday and on Sunday, Program B is now advertised for delivery in 24 hours rather than the original within 7 day promise. Conversely, if on Tuesday 50% of requesting customers selected Program C, Program C is advertised with a commitment of delivery within 7 days and there is uncommitted bandwidth available Wednesday morning, Program C may be scheduled for broadcast Wednesday morning to please the customers with "early" delivery.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of broadcasting television programs, comprising:

determining a current Program Offer for a specified time period, said Program Offer including a listing of a plurality of programs each having an associated delivery window of guaranteed broadcast from customer selection of the program;

determining an initial Playlist for broadcasting said programs at specified time slots of day and time that satisfies the delivery window;

delivering the current Program Offer to a plurality of customers via a broadcast television network;

displaying the current Program Offer including each said program and its delivery window to the customers for customer selection of said programs with knowledge of the guaranteed delivery windows and without knowledge of the specified time slots of day and time;

receiving selection information for programs in the current Program Offer by the plurality of customers;

determining an updated Playlist including updated time slots for the current Program Offer based on the initial Playlist and the selection information; and broadcasting the programs via the broadcast television network at the day and time according to the specified time slots in the updated Playlist.

2. The method of claim 1, wherein the step of determining the updated Playlist comprises moving at least one of the time slots forward to reduce a time-to-broadcast for the associated program.

3. The method of claim 1, wherein the updated Playlist broadcasts at least some of the more frequently selected programs sooner and/or more often than the initial Playlist.

4. The method of claim 1, further comprising:
receiving information on the selection of the programs in the current Program Offer by the plurality of customers; and
determining a new Program Offer based on the current Program Offer and the received information; and
delivering the new Program Offer to the plurality of customers.

5. The method of claim 4, wherein the new Program Offer is determined by changing the delivery windows for the programs in the current Program Offer.

6. The method of claim 1, wherein the current Program Offer and the initial Playlist are determined iteratively until the initial Playlist can satisfy the delivery windows for the current Program Offer.

7. The method of claim 1, wherein the delivery windows and initial Playlist are determined based on each of carriage contracts, bandwidth, program popularity and actual demand from customer selection of programs in previous Program Offers.

8. The method of claim 7, wherein each of the programs is given a score based on an optimization of the constraints that determines the delivery window.

9. The method of claim 1, further comprising delivering a Program Guide that includes a listing of other programs outside the current Program Offer and their respective fixed time slots and then broadcasting the other programs at their fixed time slots, said initial Playlist accommodating the fixed time slots occupied by the other programs and the delivery windows specified by the current Program Offer.

10. A method of broadcasting television programs, comprising:
determining a program guide for a specified time period, said program guide including a listing of a plurality of first regular scheduled programs each having a fixed broadcast time;
determining a current Program Offer for the specified time period, said Program Offer including a list of a plurality of second quasi on-demand programs each having an associated delivery window of guaranteed broadcast from customer selection of the program;
determining an initial Playlist for broadcasting said first regularly scheduled programs and said second quasi on-demand programs at specified time slots that satisfies both the fixed broadcast times and the delivery windows;
delivering the program guide and the current Program Offer to a plurality of customers via a broadcast television network for display and selection of programs, said customer selection of programs from the Program Offer with knowledge of the guaranteed delivery window and without knowledge of the specified time slots for broadcast and from the program guide with knowledge of the specified time slots for broadcast;
receiving selection information for programs in the current Program Offer by the plurality of customers;
determining an updated Playlist including updated time slots based on the initial Playlist and the selection information as customers are making selections from the current Program Offer; and
broadcasting said first and second programs via the broadcast television network in accordance with the updated Playlist.

11. The method of claim 10, wherein the updated Playlist broadcasts at least some of the more frequently selected programs sooner and/or more often than the initial Playlist.

12. The method of claim 10, wherein the current Program Offer and the initial Playlist are determined iteratively until the initial Playlist can satisfy the delivery windows for the current Program Offer.

13. The method of claim 12, wherein the delivery windows and initial Playlist are determined based on each of carriage contracts, bandwidth, program popularity and actual demand from customer selection of programs in previous Program Offers.

14. The method of claim 10, further comprising:
determining a new Program Offer based on the current Program Offer and the selection information; and
delivering the new Program Offer to the plurality of customers.

15. The method of claim 14, wherein the new Program Offer is determined by updating the delivery windows for the programs in the current Program Offer.

16. The method of claim 15, further comprising:
determining a new initial Playlist that satisfies the updated delivery windows in the new Program Offer.

17. A method of broadcasting television programs, comprising the steps of:
(a) determining a Program Offer for a time period, said Program Offer including a listing of a plurality of quasi on-demand programs each having an associated delivery window for guaranteed broadcast from customer selection of the program;
(b) determining an initial Playlist for broadcasting said programs at specific time slots of day and time that satisfies the delivery windows for the Program Offer;
(c) delivering the Program Offer to a plurality of customers via a broadcast television network for display and selection of said programs with knowledge of the guaranteed delivery window and without knowledge of specific broadcast time slots;
(d) receiving selection information for programs in the Program Offer by the plurality of customers;
(e) determining an updated Playlist including updated time slots based on the initial Playlist and the selection information as customers are making selections from the Program Offer;
(f) updating the delivery windows in the Program Offer for a subsequent time period based on the current Program offer and the selection information;
(g) broadcasting said quasi on-demand programs via the broadcast television network in accordance with the updated Playlist; and
(h) repeating steps b through g to provide a dynamically updated Playlist for the Program Offer for the current time period and a rolling Program Offer for subsequent time periods.

18. The method of claim 17, wherein the updated Program Offers are interleaved to skip at least one time period.

19. The method of claim 17, wherein the delivery windows are determined based on each of carriage contracts, bandwidth, program popularity and actual demand from customer selection of programs in previous Program Offers.

20. The method of claim 17, wherein the updated Playlist broadcasts at least some of the more frequently selected programs sooner and/or more often than the initial Playlist.

21. The method of claim 17, wherein the Program Offer and the initial Playlist are determined iteratively until the initial Playlist can satisfy the delivery windows for the Program Offer.

22. The method of claim 17, further comprising delivering a Program Guide that includes a listing of other programs outside the Program Offer and their respective fixed time slots and then broadcasting the other programs at their fixed time slots in the specified time period, said initial and updated Playlist accommodating the fixed time slots occupied by the other programs and the delivery windows specified by the Program Offer.

23. A television broadcast network, comprising:
- a broadcast playout system that stores television programs for quasi on-demand programming;
- an uplink system that inserts programs and metadata into a broadcast stream and uplinks it to a broadcast system;
- a traffic and scheduling system that creates a Program Offer for a specified time period and an initial Playlist, said Program Offer including a plurality of programs and a delivery window of guaranteed broadcast from customer selection for each said program, said initial Playlist including said programs and a time slot for broadcast in the specified time period;
- a program guide system that converts the Program Offer into metadata and forwards it to the uplink system for delivery to a plurality of customers for display and selection of the programs in the Program Offer with knowledge of the guaranteed delivery window and without knowledge of the broadcast time slot;
- a dynamic scheduling system that receives customer selection information for the programs in the Program Offer and (a) determines an updated Playlist for the current Program Offer and (b) determines a new rolling Program Offer with updated delivery windows for broadcast of the programs within a subsequent specified time period, said new rolling Program Offer being converted to metadata and uplinked to the broadcast system; and
- a broadcast control system that controls the broadcast playout system to deliver programs to the uplink system in accordance with the Playlist for the Program Offer.

24. The broadcast network of claim 23, wherein the updated Playlist broadcasts at least some of the more frequently selected programs sooner and/or more often than the initial Playlist for the current Program Offer.

25. The broadcast network of claim 23, wherein the delivery windows and initial Playlist are determined based on each of carriage contracts, bandwidth, program popularity and actual demand from customer selection of programs in previous Program Offers.

26. The broadcast network of claim 23, wherein other programs outside the current Program Offer are broadcast at fixed time slots, said initial Playlist accommodating the fixed time slots occupied by the other programs and the delivery windows specified by the current Program Offer.

27. The broadcast network of claim 23, wherein the updated Program Offers are interleaved to skip at least one time period.

28. The broadcast network of claim 23, wherein the broadcast system comprises at least one satellite.

\* \* \* \* \*